April 21, 1964     S. F. CHAPPELL     3,129,859
MEASURING DISPENSER WITH A GRAVITY OPERATED VALVE
Filed July 19, 1960     2 Sheets-Sheet 1

INVENTOR.
Story F. Chappell
BY
Curtis, Morris & Safford
ATTORNEYS

April 21, 1964 S. F. CHAPPELL 3,129,859
MEASURING DISPENSER WITH A GRAVITY OPERATED VALVE
Filed July 19, 1960 2 Sheets-Sheet 2

INVENTOR.
Story F. Chappell
BY
Curtis, Morris & Safford
ATTORNEYS

United States Patent Office 3,129,859
Patented Apr. 21, 1964

3,129,859
MEASURING DISPENSER WITH A GRAVITY OPERATED VALVE
Story F. Chappell, 9 Knoll St., Riverside, Conn.
Filed July 19, 1960, Ser. No. 43,885
1 Claim. (Cl. 222—456)

This invention relates to dispensers and in particular to dispensers which are suitable for use with a container of thick or viscous liquid, such as a detergent, soap, and shampoo.

Detergents, soaps, and shampoos are now packaged in containers which may readily be used with self-operating dispensers which provide a consistent (within tolerances acceptable to the trade) measured dose. However, as far as it is known, no adequate dispenser of this type is available which will meet the needs of these thick heavy liquids. The only known self-operating dispensing devices for these containers are those which are primarily intended for use with thin watery type liquids such as liquors and hair tonic.

In order to use many detergents properly and economically, it is necessary that only a definite and measured amount of detergent be used in making each quantity of solution. Heretofore, the standard means of measuring the correct amount of liquid detergent has been to fill the closure cap of the container with detergent so that the cap serves as a measuring cup. Such a measuring operation is cumbersome and messy as well as being a nuisance to the user.

Dispensers designed for use with thin and watery types of liquids usually have moving parts which are clogged or "frozen" by thick, heavy, viscous liquids such as detergents. Such a dispenser with easily clogged moving parts would become tightly sealed by a dried or caked film of detergent if the dispenser is left unused for any extended period of time.

Dispensers designed for use primarily with thin and watery liquids are also intricate in design and fairly expensive to manufacture and are not usually designed for insertion into containers as part of an automatic factory loading operation.

Accordingly, it is an object of the present invention to provide a dispenser particularly adapted for use with thick, viscous liquids such as detergents, shampoos, soaps, etc. It is another object to provide a dispenser which is of simple construction and inexpensive to manufacture. It is a further object to provide a dispenser which is adapted for installation into a container or can during a factory container filling operation using automatic machinery.

It is still another object of the present invention to provide a dispenser wherein the moving parts of the dispenser are at all times maintained in a leak-proof bath of the liquid thus preventing "freezing" or caking between uses. It is also a further object to provide a dispenser which gives a quick measured dose, with the flow of liquid being cut off with a minimum after-drip, as soon as the measured amount is delivered.

In the accompanying drawings, preferred embodiments of the present invention are shown and these embodiments are described in detail in the specification. However, it is to be understood that the drawings and description are not intended to be either exhaustive or limiting of the present invention in improved dispensers, but on the contrary, are for the purpose of illustrating and describing the invention in order that others skilled in the art may fully understand the invention, its principles and the application thereof and that they may embody it and adapt it in numerous forms, each as may be best suited to the requirements of a particular dispenser and its intended usage.

Figure 1:
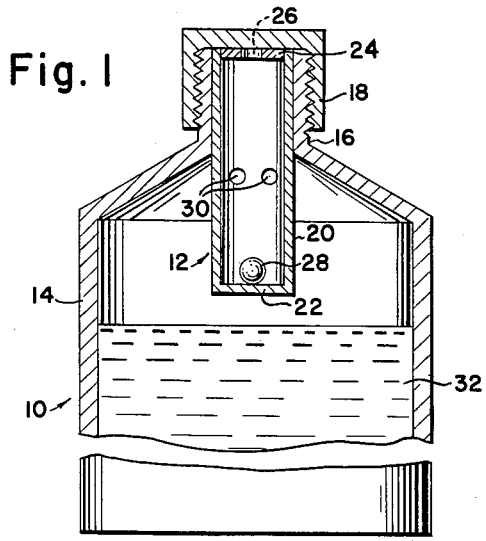
FIGURE 1 is a partial fragmentary and sectional view of a dispenser inserted into a container of liquid.

Referring to the drawings and to FIGURE 1 in particular, a container 10 is shown with a dispenser 12 inserted therein. The container 10 comprises two general portions, a body portion 14 and a neck portion 16; the neck portion 16 being adapted to be closed by means of a cap 18.

This container 10 may be of any of the well known types such as the glass, metal, or plastic containers used for packaging liquid detergents, shampoos, soaps, etc.

The illustrated dispenser 12 is a cylindrical casing with side walls 20, a bottom wall 22 and a top wall 24. The top wall 24 is cut away to provide an opening 26 which may be centrally or eccentrically located and serves the dual purpose of being a valve seat and also being a pouring opening for detergent to be dispensed.

A ball valve 28 is positioned within the dispenser 12. This ball valve 28 may be of any suitable material such as glass, metal, hard plastic, etc. In selecting the material for the ball valve and cylindrical casing care must be taken to insure that the material will not affect or be adversely affected by the liquid contents of the container.

In the side wall 20 of the dispenser a plurality of inlet openings 30 are provided. These openings 30 are advantageously placed approximately midway between the bottom wall 22 and the top wall 24 and only on one side of sidewall 20.

When the dispenser 12 is inserted into the container 10 it is advantageously placed so that the inlet openings 30 are within the body portion 14 and adjacent to the juncture between the neck and body portions. Thus, approximately one half of the dispenser 12 is within the body portion 14 and one-half is within or partially extending beyond the neck portion 16.

The container 10 is substantially filled with a liquid 32 which may be a detergent, soap, shampoo or any similar substance which is normally used in measured quantities.

Figure 2:
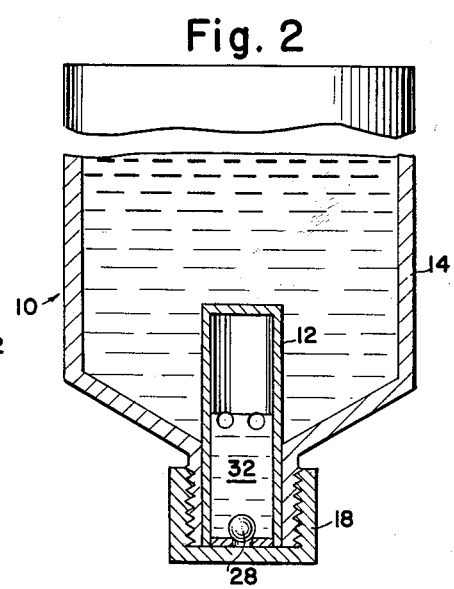
FIGURE 2 is a partially fragmentary and sectional view of the container of FIGURE 1, with the container in an inverted position.
Figure 3:
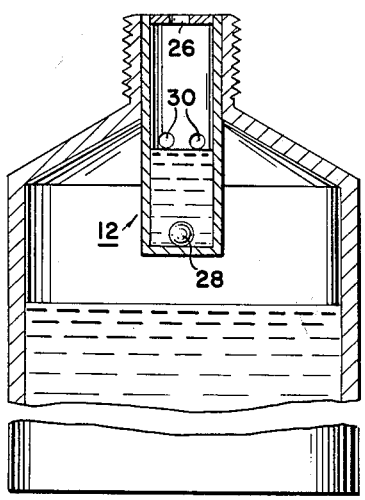
FIGURE 3 is a partially fragmentary and sectional view of the dispenser and container of FIGURE 2, after it has been returned to an upright position.

To obtain a measured dose of the liquid 32, the container 10 is first inverted to the general position shown in FIGURE 2. When the container is inverted to this position, the dispenser 12 becomes partially filled with liquid 32 up to the level of inlet openings 30, at which point further flow of liquid from container 10 into dispenser 12 ceases. Additional liquid may enter the dispenser during the returning operation but after the container is returned to an upright position, as shown in FIGURE 3, the dispenser loses all liquid which is above the inlet openings 30 in the side wall 20. In the upright position shown in FIGURE 3, the ball valve 28 rests on the bottom wall 22.

Figure 4:
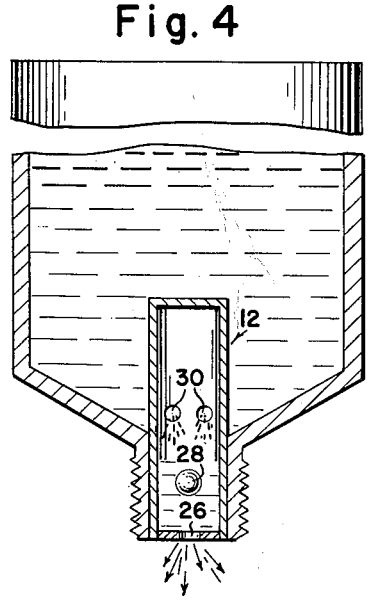
FIGURE 4 is a partially fragmentary and sectional view of the dispenser and container of FIGURE 3 with the cap removed and just after the container has been turned into an inverted position.

To obtain a measured dose the container is first brought to the condition shown in FIGURE 3, then the cap 18 is removed and the container 10 is inverted to the approximate position shown in FIGURE 4. With the container so inverted, most of thhe liquid which was in the lower half of the dispenser 12 quickly passes through the opening 26 in the top wall 24, ahead of the ball valve 28 rapidly rolling or falling the length of the dispenser 12. When a measured amount of liquid has passed through the opening 26 the valve becomes seated in this opening, cutting off further flow of liquid. The falling ball valve 28 may also act, to some degree, as a piston to drive the thick liquid downwardly before it. When the ball valve 28 is seated in the opening 26, liquid will continue to flow through the inlet openings 30 so that the dispenser will be partially filled once again as generally shown in FIGURE 2.

When the container 10 is inverted from the position of FIGURE 4 to a correct upright condition, the ball valve 28 will once again fall to the bottom wall 22 and the condition shown in FIGURE 3 will be reestablished.

As shown in FIGURE 3, the ball valve 28 is always maintained in a leak-proof bath of liquid 32 when not in use, regardless of the amount of liquid in the container 10 (except at the start when it is free of all liquid as shown in FIGURE 1). This condition in FIGURE 3 is very advantageous since being permanently immersed prevents the ball valve 28 from becoming caked, gummy, or "frozen" between uses. With dispensers which do not provide for a continuous bath, evaporation takes place between uses resulting in sticking or "freezing" of moving parts to make the dispenser operate erratically or not at all.

The location of the inlet openings 30 in the vicinity of the juncture of the body 14 and the neck 16 insures that the last remaining appreciable amount of liquid in the container 10 will be obtained as the last measured dose. Thus, the present arrangement provides for economical and complete distribution of the liquid from the container.

Figure 10:
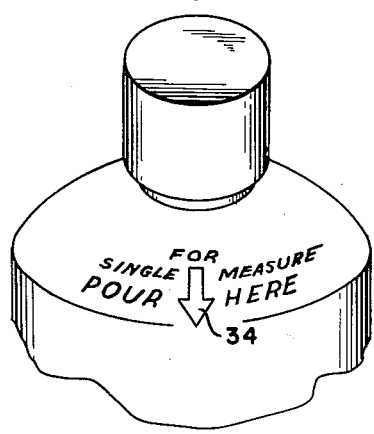
FIGURE 10 is a partial fragmentary view of the top portion of a container suitable for use with a dispenser of the type described herein showing a pouring indicator on the container.

During the pouring operation it is advantageous to pour the liquid along that portion of the side wall which is opposite from the openings 30. To facilitate the user in pouring, the outer neck portion or the truncated part of the body 14 may be provided with a suitable indicator 34 as shown in FIGURE 10. Indicator may also be provided on outside of sidewall 20, when sidewall extends above top of neck portion 16 with dispenser in place. If the pour were made on the side with the openings 30, some of the measured dose in the lower half of the dispenser 12 would flow through those openings rather than through the main opening 26 in the pouring operation and some of the liquid collected in the upper half of the now-inverted dispenser would be lost through openings 30 when container is returned to upright position.

In each pouring operation described above, part of the measured dosage that is poured comes from the liquid in the lower half of dispenser 12 and part comes from the flow of liquid from container 10 through openings 30 and directly out through opening 26 before ball valve seats to shut off further flow. When there is a relatively small amount of liquid in container 10, there is a delay or pause before liquid begins to flow through opening 30. The reason for the delay is that the liquid must travel a greater distance from the lower region of container 10 to the location of the side openings 30 than is the case when the container 10 is full. As a result, more liquid will be added to measured dose when container 10 is in full condition than when relatively empty, causing a discrepancy in measured amount.

Figure 5:
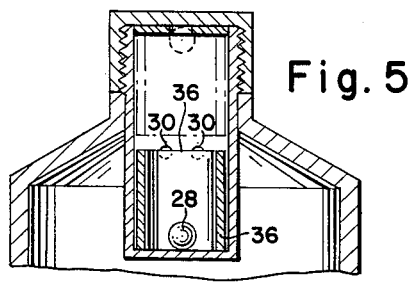
FIGURE 5 is a fragmentary sectional view of a container with a dispenser of an embodiment wherein a slide valve is incorporated therein.

In order to provide a consistent flow through openings 30 regardless of the quantity of liquid in container 10, I provide a means of substantially blocking off the openings 30 thus preventing liquid flow through them, until ball valve 28 has seated and container 10 is in approximately upside down position. Thus liquid in container cannot mingle with pre-measured amount in dispenser 12 during pouring operation. To accomplish this, a non-buoyant slideable sleeve 36 may be provided within the dispenser 12 as shown in FIGURE 5. As shown in FIGURE 5, the sleeve 36 is open at both its upper and lower ends. The sleeve is placed concentrically within the dispenser 12 and slidably adjacent to the side wall 20.

The sleeve 36 extends from the bottom wall 22 to a point partially or completely obtrusive of, the inlet openings 30. The ball valve 28 is contained within the sleeve 36, which has an inside diameter great enough to allow the free passage of ball valve 28 throughout its length. When a dispenser of the construction shown in FIGURE 5 is moved through the operations depicted in FIGURES 1, 2, 3, and 4, the sleeve 36 substantially seals off the opennigs 30 until the container 10 is inverted. With the openings 30 sealed off, the ball valve and the measured dose of liquid in the lower portion of the dispenser 12 fall to the inverted end of the dispenser. The sleeve 36 which cannot stick because it also is always maintained in a bath of liquid also slides the length of the dispenser 12 until it comes to rest against the top wall 24. In this position it has moved past and clear of the openings 30 which in this construction are preferably located nearer bottom wall 22 than top wall 24. With the openings 30 cleared by the sleeve 36, liquid 32 pours in through the inlet openings and refills the dispenser 12 and any excess liquid flows out through unobstructed portion of the openings 30 or seeps out if obstruction is complete, leaving the measured amount in the lower half of the dispenser ready for the next pour.

As shown in FIGURE 5, the sleeve 36 extends from the bottom wall 22. Optionally, it may be of shorter length and supported in the area of openings 30 by a shoulder or other means that will stop the fall of sleeve 36 to the bottom wall 22, but still allow passage of ball valve 28, so valve will fall to bottom wall 22.

As shown in FIGURE 5, the openings 30 are one side only of sidewall 20. As previously described, this makes it advantageous to pour the liquid along that portion of the sidewall which is opposite from the openings. To accomplish this, it is necessary to hold container 10 in such a position that openings 30 will face upward during pouring operation. However, in some usages I contemplate providing a plurality of openings completely around the circumference of the cylinder wall, so container can be picked up and poured from any position. In so doing, the openings on all sides will be substantially blocked by sleeve 36 when container is being poured and there will be negligible loss of liquid through the openings on the underside. However, when returning container to upright position, sleeve is not in a position to block the openings and there will be some loss of liquid through openings on the underside. To compensate for this, I provide sufficient excess capacity to top part of dispenser to allow this loss of liquid to occur, yet have sufficient liquid remaining to fill bottom part of dispenser when container is again in upright position.

In the embodiment described above there may be applications where it is desirable to briefly delay the roll or fall of the ball valve during pouring operation to allow more time for liquid in dispenser to escape through opening 26. This may be accomplished by tapering bottom wall 22 to a rounded point designed so that a partial suction will hold ball for a brief instant longer than if it were rolling or falling free.

Figure 6:
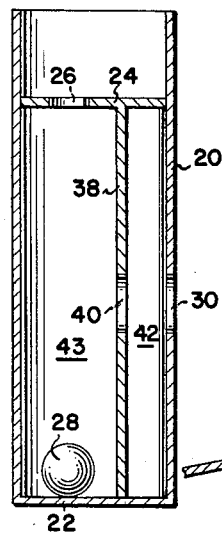
FIGURE 6 is a sectional view of an embodiment of a dispenser wherein a side storage space is included therein.

Referring to FIGURE 6, another embodiment of a dispenser in accordance with the present invention is shown. In this embodiment, the dispenser 12 has an eccentrically located longitudinal partition 38 which extends from the top wall 24 to the bottom wall 22. Partition 38 has an opening 40 therein and this opening 40 is substantially opposite the side opening 30 in the side wall 20.

In this embodiment in FIGURE 6, the opening 26 in the top wall 24 is advantageously eccentrically located.

Region 42, between the partition 38 and that portion of the side wall 20 having the opening 30 therein, serves as a trap to hold some liquid each time the container 10 is inverted and then righted. When the container 10 is inverted in order to pour a measured dose of liquid, the liquid trapped in region 42 immediately flows through the partition opening 40 and into the main interior region 43 of the dispenser. This readily accessible liquid helps obtain a more consistent pour every time regardless of the height of the liquid in the container 10, and the possible slight delay or pause before liquid begins to flow through the opening 30 as previously described. With liquid trapped in region 42, there is an immediate pouring of liquid into the dispenser proper through opening 40, to provide a more consistent pour.

It will be understood that when the container 10 is inverted the region 43 as well as the trap region 42 will be partially filled with liquid in the same manner as described previously for the dispenser without a partition.

In the embodiment of FIGURE 6 the top wall 24 is shown recessed below the uppermost portion of the side wall 20 to form a desirable drip-catching spout which may extend beyond neck portion 16 of container 10, if desired, in which case closure cap 18 would fit directly on top of the spout. It is to be understood that this top wall 24 may be positioned at the uppermost end of the side wall 20 as in the embodiment in FIGURE 1, if desired.

Figure 7:
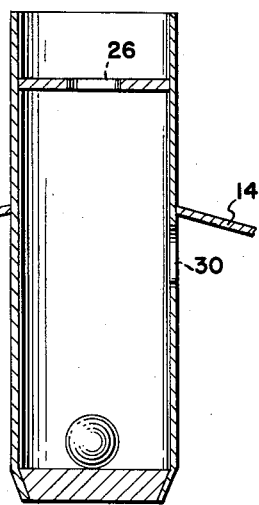
FIGURE 7 is a sectional view of a dispenser which is particularly suited to automatic machine filling operations.
Figure 8:
FIGURE 8 is an exploded view of the parts of the embodiment shown in FIGURE 7.
Figure 8:
Figure 8:
Figure 8:
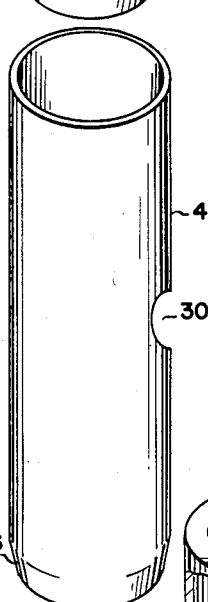

In FIGURE 7, another embodiment of the present invention in dispensers is shown. This embodiment is particularly suited for use with automatic can filling machinery. This dispenser, as shown in FIGURE 8 in particular, comprises a series of components including a shell or casing 44 having an inwardly tapered bottom portion 46, a bottom wall piece 48 mating with the tapered portion 46, a ball valve 28, a top wall or valve seat 50, and an opening 30 in the side of the casing 44. This dispenser in actual operation functions the same as that shown in FIGURES 1–4 and previously described.

In automatic can filling operations, the shell or casing 44 is preferably made an integral part of the container 10 and built into the container. After the container 10 is filled with the shell 44 in place, the tapered bottom wall 48 is inserted into the shell 44 plugging the bottom of the shell. The ball valve 28 is next dropped into the casing 44 and, finally, the top wall or valve seat 50 is set in place. In FIGURE 7, the top wall or valve seat 50 is shown recessed below the top of the casing 44 to form a drip-catching spout, but it is to be understood that, if desired, the top wall 50 may be placed at the upper extent of the shell 44.

Figure 9:
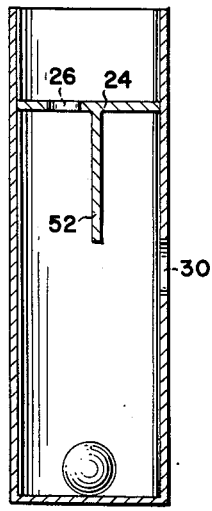
FIGURE 9 is a sectional view of a dispenser which provides either continuous flow or a measured dose of liquid.

Another embodiment of the present invention is shown in FIGURE 9. This embodiment is similar to that in FIGURE 6. However, in this embodiment only a partial partition 52 is provided. This partition extends downwardly from the top wall 24 to a point above the opening 30 in the side wall 20 to form a trap which catches the first flow of liquid from container, thus keeping it from mingling with liquid in dispenser until ball valve seats.

The top wall 24 has an eccentrically located opening 26 which is positioned to the side of partition 52 and away from the opening 30 in the side wall 20. This embodiment improves consistency of measured dose pour and advantageously permits the user to obtain a continuous flow of liquid or a measured dose, whichever is desired.

If a measured dose is required, the container holding the dispenser 12 is inverted so that the ball valve will move towards the valve seat 26. If a continuous flow is desired, the container is inverted so that the ball valve will be trapped between the partition 52 and that portion of the side wall 20 containing the side opening 30. With the ball valve so trapped a continuous flow of liquid will be maintained into and through the dispenser; the flow being through the opening 30 and out the valve opening 26. Optional free flow on measured dose can be obtained also without partition 52, by providing sufficient top wall space adjacent to eccentrically located opening 26 to serve as resting place for ball valve 28.

The container 10 may be marked as shown in FIGURE 10 to indicate on which side the opening 24 is located. The opposite side, of course, may be marked for continuous pouring. Markings can also be provided on outside of sidewall 20 extending above neck portion 16, as previously noted.

Figure 11:
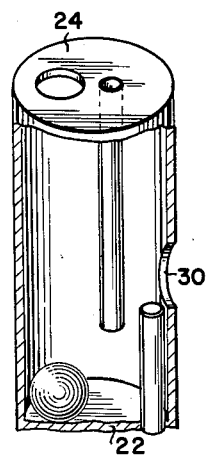
FIGURE 11 is a perspective view of another embodiment of dispensers with a portion of one wall cut away.

My invention and its embodiments heretofore described are shown without air vent holes or tubes. It is contemplated, however, that in certain usages it will be advantageous to provide one or more air vent openings or tubes in the invention or any of its embodiments substantially as shown in FIGURE 11.

Optional use of one or more air vent tubes allows opening 30 to be decreased in size, to obtain a more consistent pour without sacrificing speed of operation of the dispenser.

From the foregoing it will be seen that the present invention in dispensers and a dispenser in combination with a container accomplishes the various objects set forth hereinbefore as well as others which are apparent.

I claim:

A viscous liquid dispenser for use with a container having an opening therein, said dispenser comprising a casing adapted to be fitted into the container opening and a slidable open sleeve and ball valve within said casing, said casing having side walls, a bottom wall and a valve seat opening in the top portion of said casing, an opening in said side walls approximately intermediate between said valve seat and said bottom, said sidewalls being imperforate except for said openings whereby a measured amount of liquid may be retained in said casing below said side wall openings when said container is in an upright position, said slidable sleeve extending up to and partially obstructive of the opening in the side wall when the dispenser is in an upright position, whereby the sleeve will obstruct said side wall opening when the dispenser is inverted and prevent flow of liquid into said casing until the ball valve has engaged the valve seat and cut off the flow of liquid from said dispenser.

References Cited in the file of this patent

UNITED STATES PATENTS

| | | |
|---|---|---|
| 1,710,517 | Simons | Apr. 23, 1929 |
| 1,773,475 | Casey | Aug. 19, 1930 |
| 1,990,226 | Eisemann | Feb. 5, 1935 |
| 2,141,871 | Koukal | Dec. 27, 1938 |
| 2,368,540 | Goodman | Jan. 30, 1945 |
| 2,718,987 | Kimball | Sept. 27, 1955 |

FOREIGN PATENTS

| | | |
|---|---|---|
| 365,694 | France | Sept. 14, 1906 |
| 402,258 | France | Oct. 2, 1909 |
| 537,036 | Italy | Dec. 15, 1955 |